(12) United States Patent
Bray et al.

(10) Patent No.: US 7,531,150 B2
(45) Date of Patent: May 12, 2009

(54) METHOD OF SEPARATING AND PURIFYING CESIUM-131 FROM BARIUM CARBONATE

(75) Inventors: Lane Allan Bray, Richland, WA (US); Garrett N. Brown, Richland, WA (US); David J. Swanberg, Kennewick, WA (US)

(73) Assignee: IsoRay Medical, Inc., Richland, WA (US)

( * ) Notice: Subject to any disclaimer, the term of this patent is extended or adjusted under 35 U.S.C. 154(b) by 716 days.

(21) Appl. No.: 11/191,143

(22) Filed: Jul. 27, 2005

(65) Prior Publication Data
US 2006/0024223 A1 Feb. 2, 2006

Related U.S. Application Data

(60) Provisional application No. 60/591,765, filed on Jul. 28, 2004, provisional application No. 60/630,827, filed on Nov. 23, 2004.

(51) Int. Cl.
*C01D 17/00* (2006.01)
(52) U.S. Cl. ........................................... 423/2; 423/249
(58) Field of Classification Search ..................... 423/2, 423/249
See application file for complete search history.

(56) References Cited

U.S. PATENT DOCUMENTS

| | | | |
|---|---|---|---|
| 1,753,287 A | 4/1930 | Failla | |
| 3,351,049 A | 11/1967 | Lawrence | 128/1.2 |
| 3,706,689 A | 12/1972 | Haskins | 252/301.1 R |
| 4,323,055 A | 4/1982 | Kubiatowicz | 128/1.2 |
| 4,702,228 A | 10/1987 | Russell, Jr. et al. | 128/1.2 |
| 4,784,116 A | 11/1988 | Russell, Jr. et al. | 128/1.2 |
| 4,891,165 A | 1/1990 | Suthanthiran | 252/633 |
| 4,994,013 A | 2/1991 | Suthanthiran et al. | 600/8 |
| 5,071,610 A | 12/1991 | Hagan et al. | 264/120 |
| 5,163,896 A | 11/1992 | Suthanthiran et al. | 600/8 |
| 5,342,283 A | 8/1994 | Good | 600/8 |
| 5,368,736 A | 11/1994 | Horwitz et al. | 210/635 |
| 5,405,309 A | 4/1995 | Carden, Jr. | 600/3 |
| 5,512,256 A | 4/1996 | Bray et al. | 423/2 |
| 5,591,420 A | 1/1997 | Balmer | 423/700 |
| 5,683,345 A | 11/1997 | Waksman et al. | 600/3 |
| 5,749,042 A | 5/1998 | Bray et al. | 423/2 |
| 5,899,882 A | 5/1999 | Waksman et al. | 604/96 |
| 6,060,036 A | 5/2000 | Armini | 424/1.29 |
| 6,066,302 A | 5/2000 | Bray | 423/2 |
| 6,099,457 A | 8/2000 | Good | 600/8 |
| 6,099,458 A | 8/2000 | Robertson | 600/8 |
| 6,139,749 A | 10/2000 | Goken et al. | 210/651 |
| 6,306,074 B1 | 10/2001 | Waksman et al. | 600/7 |
| 6,309,614 B1 | 10/2001 | Horwitz et al. | 423/2 |
| 6,351,049 B1 | 2/2002 | Chassoulier et al. | 310/90.5 |
| 6,403,916 B1 | 6/2002 | Spooner et al. | 219/121.63 |
| 6,458,070 B1 | 10/2002 | Waksman et al. | 600/3 |
| 6,471,632 B1 | 10/2002 | Jahrmarkt et al. | 600/8 |
| 6,479,920 B1 | 11/2002 | Lal et al. | 310/309 |
| 6,485,406 B1 | 11/2002 | Ziegler et al. | 600/8 |
| 6,503,185 B1 | 1/2003 | Waksman et al. | 600/3 |
| 6,554,756 B1 | 4/2003 | Schaart | 600/3 |
| 6,589,502 B1 | 7/2003 | Coniglione et al. | 424/1.25 |
| 6,608,277 B2 | 8/2003 | Spooner et al. | 219/121.63 |
| 6,666,811 B1 | 12/2003 | Good | 600/8 |
| 6,679,824 B1 | 1/2004 | Reed et al. | 600/7 |
| 6,689,043 B1 | 2/2004 | McIntire et al. | 600/1 |
| 6,730,013 B1 | 5/2004 | Shank et al. | 600/7 |
| 6,749,554 B1 | 6/2004 | Snow et al. | 600/3 |
| 6,821,242 B1 | 11/2004 | Waksman et al. | 600/3 |
| 7,316,644 B2 * | 1/2008 | Bray | 600/8 |
| 2002/0022781 A1 | 2/2002 | McIntire et al. | 600/458 |
| 2002/0162828 A1 | 11/2002 | Spooner et al. | 219/121.63 |
| 2003/0088146 A1 | 5/2003 | Slater et al. | 600/8 |
| 2003/0092959 A1 | 5/2003 | Slater et al. | 600/8 |
| 2003/0229259 A1 | 12/2003 | Waksman et al. | 600/3 |
| 2004/0076579 A1 | 4/2004 | Coniglione et al. | 424/1.11 |
| 2004/0097779 A1 | 5/2004 | McIntire et al. | 600/1 |
| 2004/0192999 A1 | 9/2004 | Waksman et al. | 600/4 |
| 2004/0236169 A1 | 11/2004 | Slater et al. | 600/8 |
| 2004/0242953 A1 | 12/2004 | Good | 600/7 |
| 2006/0018813 A1 | 1/2006 | Bray | 423/11 |

(Continued)

FOREIGN PATENT DOCUMENTS

JP 01-254900 10/1989

(Continued)

OTHER PUBLICATIONS

Harper, P.V. et al., "Isotopes Decaying by Electron Capture: a New Modality in Brachytherapy," in *Proceedings of the International Conference on the Peaceful Uses of Atomic Energy*, Geneva Switzerland, 1958, pp. 417-422.

(Continued)

*Primary Examiner*—Steven Bos
(74) *Attorney, Agent, or Firm*—Seed IP Law Group PLLC

(57) ABSTRACT

The present invention provides a method of separating and purifying Cesium-131 (Cs-131) from Barium (Ba). Uses of the Cs-131 purified by the method include cancer research and treatment, such as for the use in brachytherapy. Cs-131 is particularly useful in the treatment of faster growing tumors.

11 Claims, 3 Drawing Sheets

U.S. PATENT DOCUMENTS

2006/0051269 A1     3/2006    Bray et al. .................. 423/158
2006/0167332 A1     7/2006    Bray ............................ 600/3

FOREIGN PATENT DOCUMENTS

WO      WO 00/51136      8/2000
WO      WO 01/80251      10/2001
WO      WO 2004/053892      6/2004

OTHER PUBLICATIONS

Kurath, D.E. et al., "Ion Exchange Removal of Cesium from Simulated and Actual Hanford Tanks 241-SY-101 and 241-SY-103," in *Proceedings of the International Topical Meeting on Nuclear and Hazardous Waste Management Spectrum '96*, Aug. 18-23, 1996, Seattle, Washington, American Nuclear Society, La Grange Park, IL, 1996, pp. 222-228.

3M Empore™ Rad Disks Product Listing, 1998. Available at http://www.mmm.com/empore, downloaded Mar. 11, 2004.

Balmer, M.L. et al., "New Silicotitanate Waste Forms: Development and Characterization," Interfacial and Processing Sciences Annual Report 1999. Available at http://www.pni.gov/microcats/aboutus/publications/microsystems/annual_report1999. Downloaded Sep. 19, 2004.

Hobbs, D.T., "Strategic Design and Optimization of Inorganic Sorberts for Cesium, Strontium, and Actinides," Westinghouse Savannah River Company Report WSRC-RP-2002-00337. Available at http://www.osti.gov/bridge. Downloaded Oct. 5, 2005.

Cary, A., "PNNL gel may charge drug obstacles," *Tri-City Herald*, Mar. 30, 2001. Available at http://www.tri-cityherald.com. Downloaded Oct. 8, 2004.

Hodgman, C.D. (ed.), *"Handbook of Chemistry and Physics, 31st edition,"* Chemical Rubber Publishing Co., Cleveland, OH, pp. 408-409, 1949.

Hodgman, C.D. (ed.), *"Handbook of Chemistry and Physics, 31st edition,"* Chemical Rubber Publishing Co., Cleveland, OH, pp. 524-525, 1949.

Kraus and Nelson, "Anion Exchange Studies of the Fission Products," in *Proc. Int. Conf. Peaceful Uses of Atomic Energy*, vol. 7, Geneve, 1955, pp. 113-125.

Naumann, R.A. et al., "Preparation of Radioactive Targets for Charged-Particle Nuclear Spectroscopy at the CERN-ISOLDE Project," *Nuclear Instruments and Methods in Physics Research B 26*: 59-64, 1987.

pSiVida Company, BioSilicon internet web pages. Available at http://www.psivida.com.au/text. Downloaded Nov. 3, 2004.

Smith, L.L. et al., "Application of Empore™ Strontium Rad Disks to the Analysis of Radiostrontium in Environmental Water Samples," *Radiochemica Acts 73*:165-170, 1996.

Willard and Goodspeed, "Separation of Strontium, Barium, and Lead from Calcium and Other Metals," *Industrial and Engineering Chemistry 8*(6):414-418, 1936.

"Radiation protection—Sealed radioactive sources—Leakage test methods," International Standard ISO 9978, First Edition, Feb. 15, 1992.

"Radiation protection—Sealed radioactive sources—General requirements and classification," International Standard ISO 2919, Second Edition, Feb. 15, 1992.

R. Braun et al., "Crystalline Silicotitanates—Novel Commercial Cesium Ion Exchangers," UOP, pp. 1-12, pre-Nov. 2003.

Heintz, B.H. et al., "Comparison of I-125 sources used for permanent interstitial implants," *Med. Phys. 28*(4): 671-682, Apr. 2001.

Henschke, U.K. et al., "Cesium-131 Seeds for Permanent Implants," *Radiology 85*(6): 1117-1119, Dec. 1965.

Korb, L.J. et al., "Modern Brachytherapy for Localized Prostate Cancers: The Northwest Hospital (Seattle) Experience," *Review in Urology 3*(1): 51-60, Winter 2001.

Armpilia, C.I. et al., "The Determination of Radiobiologically Optimized Half-lives for Radionuclides Used in Permanent Brachytherapy Implants," *Int. J. Radiation Oncology Biol. Phys. 55*(2): 378-385, 2003.

Malinin, A.B. et al., "Production of $^{131}$Cs Without a Carrier and Estimation of the Cross Section of the Reaction $^{131}$Cs(n,$\gamma$) $^{132}$Cs on Thermal Neutrons," *Soviet Radiochemistry 14*(6): 896-899, Nov.-Dec. 1972.

Wike, J.S. et al., "Chemistry for Commercial Scale Production of Yttrium-90 for Medical Research," *International Journal of Radiation Applications and Instrumentation Part A*, 41(9): 861-865, 1990.

\* cited by examiner

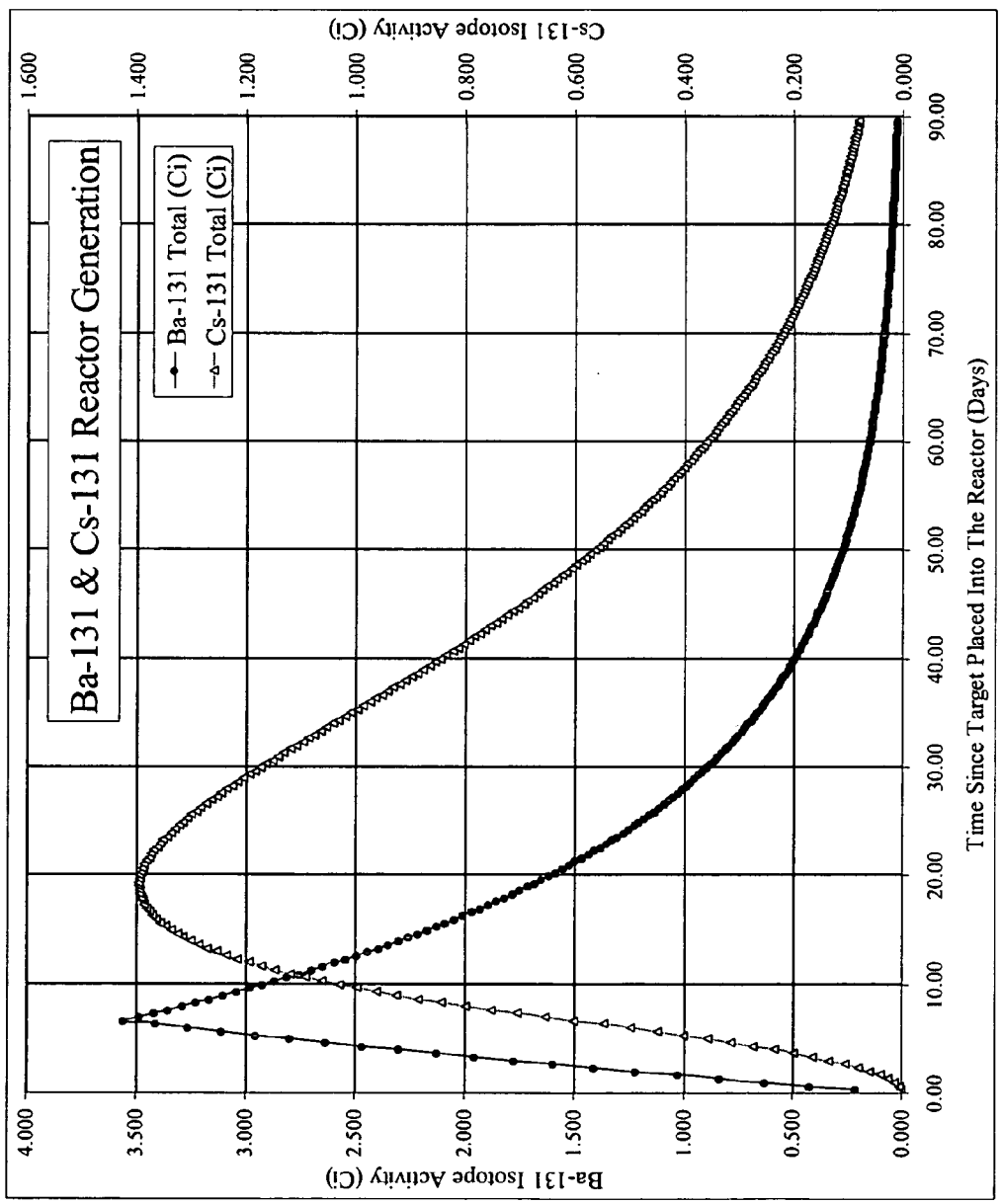
Figure 1: Reactor Generation of Ba-131 and Cs-131 In-Growth

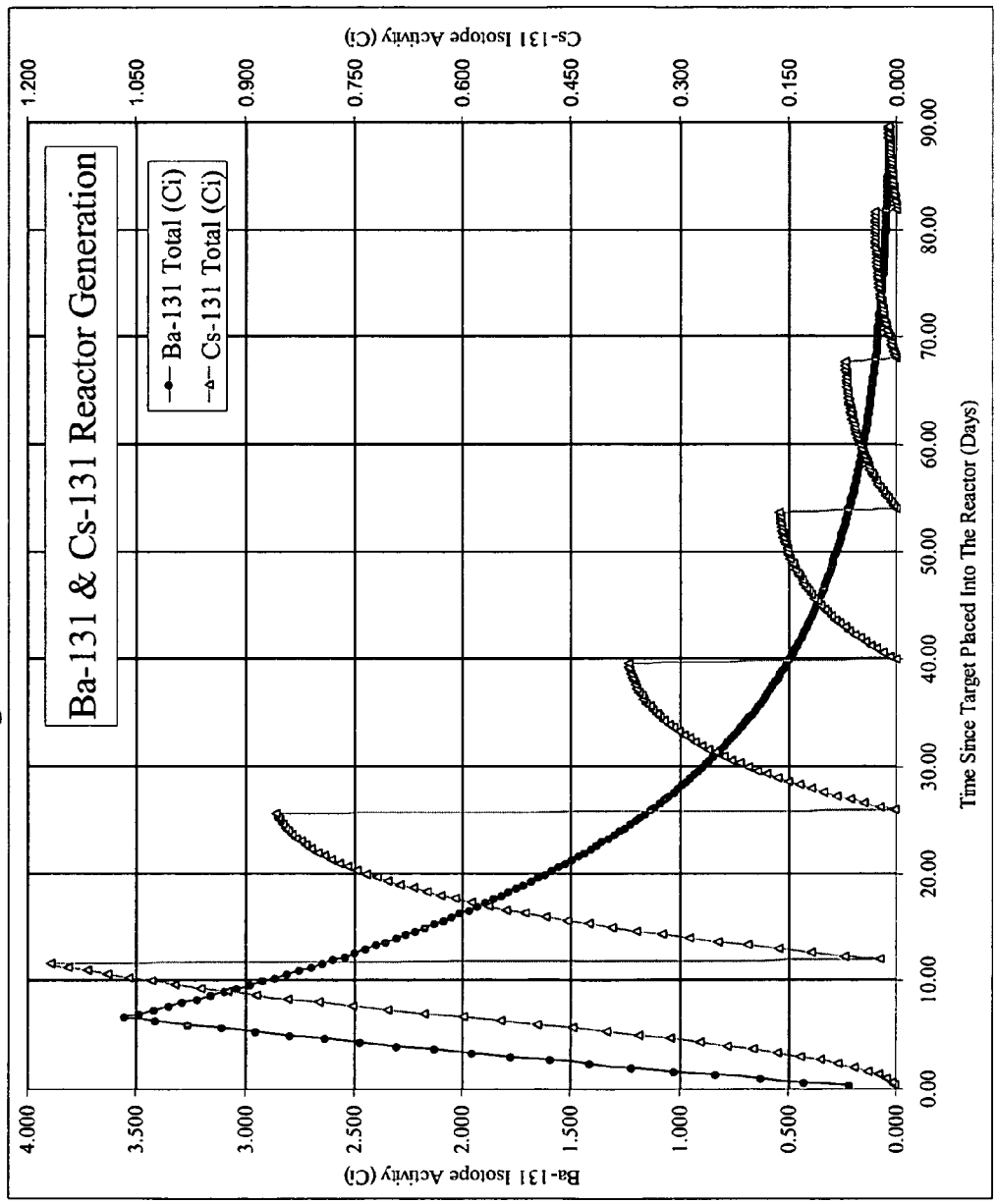
*Figure 2: Simulated "Milking" of Ba-131 Target*

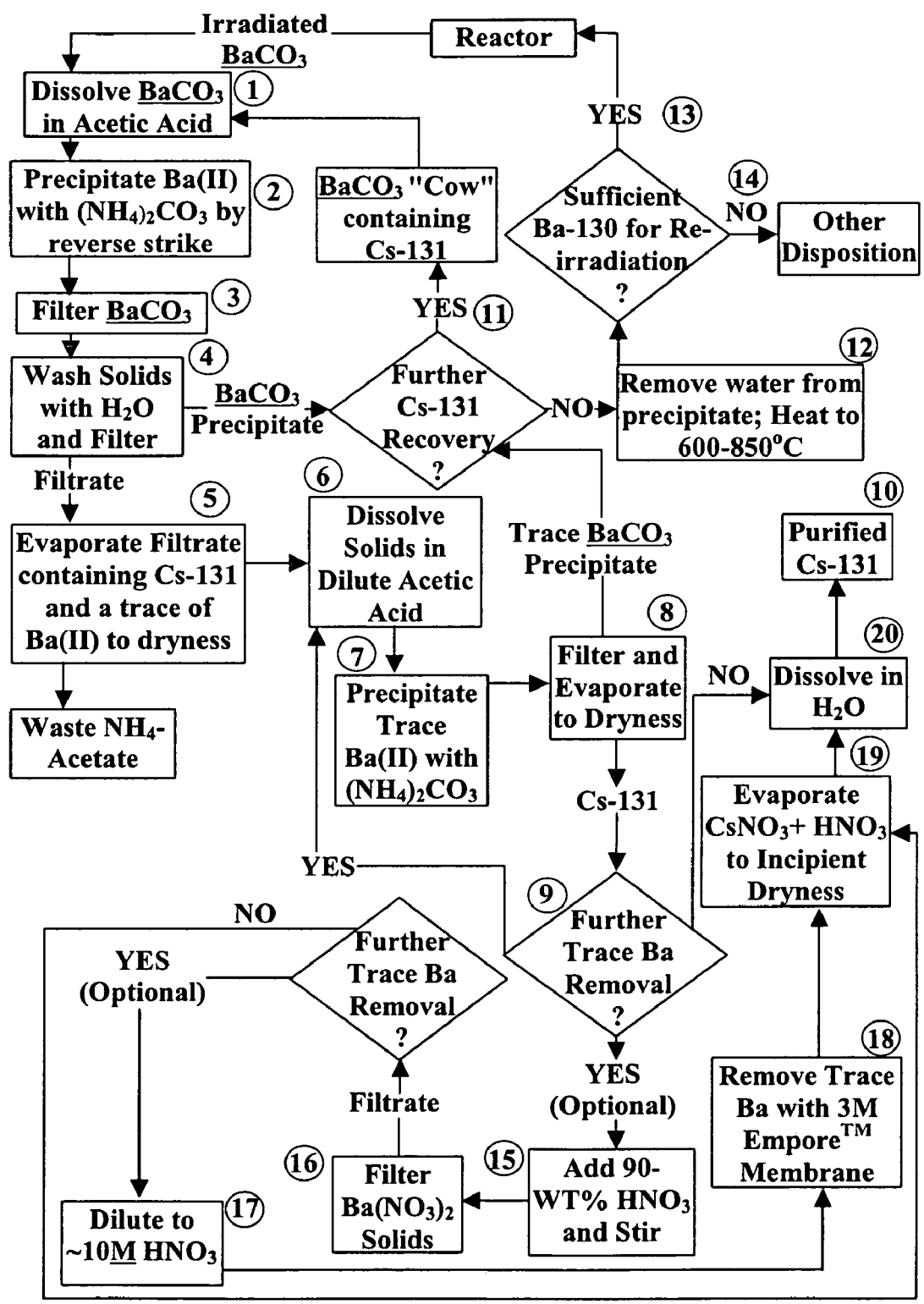
Figure 3: Cs/Ba Carbonate Separations Process Flow Diagram

METHOD OF SEPARATING AND PURIFYING CESIUM-131 FROM BARIUM CARBONATE

CROSS-REFERENCES TO RELATED APPLICATIONS

This application claims the benefit under 35 U.S.C. § 119 (e) of U.S. Provisional Patent Application No. 60/591,765 filed Jul. 28, 2004 and U.S. Provisional Patent Application No. 60/630,827 filed Nov. 23, 2004, where these two provisional applications are incorporated herein by reference in their entirety.

BACKGROUND OF THE INVENTION

1. Field of the Invention

The present invention relates generally to a method of separating Cesium-131 (Cs-131) from Barium (Ba). Uses of the Cs-131 purified by the method include cancer research and treatment, such as for use in brachytherapy implant seeds independent of method of fabrication.

2. Description of the Related Art

Radiation therapy (radiotherapy) refers to the treatment of diseases, including primarily the treatment of tumors such as cancer, with radiation. Radiotherapy is used to destroy malignant or unwanted tissue without causing excessive damage to the nearby healthy tissues.

Ionizing radiation can be used to selectively destroy cancerous cells contained within healthy tissue. Malignant cells are normally more sensitive to radiation than healthy cells. Therefore, by applying radiation of the correct amount over the ideal time period, it is possible to destroy all of the undesired cancer cells while saving or minimizing damage to the healthy tissue. For many decades, localized cancer has often been cured by the application of a carefully determined quantity of ionizing radiation during an appropriate period of time. Various methods have been developed for irradiating cancerous tissue while minimizing damage to the nearby healthy tissue. Such methods include the use of high-energy radiation beams from linear accelerators and other devices designed for use in external beam radiotherapy.

Another method of radiotherapy includes brachytherapy. Here, substances in the form of seeds, needles, wires or catheters are implanted permanently or temporarily directed into/ near the cancerous tumor. Historically, radioactive materials used have included radon, radium and iridium-192. More recently, the radioactive isotopes Cs-131, iodine (I-125), and palladium (Pd-103) have been used. Examples are described in U.S. Pat. Nos. 3,351,049; 4,323,055; and 4,784,116.

During the last 30 years, numerous articles have been published on the use of I-125 and Pd-103 in treating slow growth prostate cancer. Despite the demonstrated success in certain regards of I-125 and Pd-103, there are certain disadvantages and limitations in their use. While the total dose can be controlled by the quantity and spacing of the seeds, the dose rate is set by the half-life of the radioisotope (60 days for I-125 and 17 days for Pd-103). For use in faster growing tumors, the radiation should be delivered to the cancerous cells at a faster, more uniform rate, while simultaneously preserving all of the advantages of using a soft x-ray emitting radioisotope. Such cancers are those found in the brain, lung, pancreas, prostate and other tissues.

Cesium-131 (Cs-131) is a radionuclide product that is ideally suited for use in brachytherapy (cancer treatment using interstitial implants, i.e., "radioactive seeds"). The short half-life of Cs-131 makes the seeds effective against faster growing tumors such as those found in the brain, lung, and other sites (e.g., for prostate cancer).

Cesium-131 is produced by radioactive decay from neutron irradiated naturally occurring Ba-130 (natural Ba comprises about 0.1% Ba-130) or from enriched barium containing additional Ba-130, which captures a neutron, becoming Ba-131. Ba-131 then decays with an 11.5-day half-life to cesium-131, which subsequently decays with a 9.7-day half-life to stable xenon-130. A representation of the in-growth of Ba-131 during 7-days in a typical reactor followed by decay after leaving the reactor is shown in FIG. 1. The buildup of Cs-131 with the decay of Ba-131 is also shown. To separate the Cs-131, the barium target is "milked" multiple times over selected intervals such as 7 to 14 days, as Ba-131 decays to Cs-131, as depicted in FIG. 2. With each "milking", the Curies of Cs-131 and gram ratio of Cs to Ba decreases (less Cs-131) until it is not economically of value to continue to "milk the cow" (as shown after ~40 days). The barium "target" can then be returned to the reactor for further irradiation (if sufficient Ba-130 is present) or discarded.

In order to be useful, the Cs-131 must be exceptionally pure, free from other metal (e.g., natural barium, calcium, iron, Ba-130, etc.) and radioactive ions including Ba-131. A typical radionuclide purity acceptance criteria for Cs-131 is >99.9% Cs-131 and <0.01% Ba-131.

The objective in producing highly purified Cs-131 from irradiated barium is to completely separate less than $7 \times 10^{-7}$ grams (0.7 µg) of Cs from each gram (1,000,000 µg) of barium "target". A typical target size may range from 30 to 60 grams of Ba(II), (natural Ba comprises about 0.1% Ba-130). Because Cs-131 is formed in the $BaCO_3$ crystal structure during decay of Ba-131, it is assumed that the Ba "target" must first be dissolved to release the very soluble Cs(I) ion.

Due to the need for highly purified Cs-131 and the deficiencies in the current approaches in the art, there is a need for improved methods. The present invention fulfills this need and further provides other related advantages.

BRIEF SUMMARY OF THE INVENTION

Briefly stated, the present invention discloses a method of producing and purifying Cs-131. The method comprises the steps of: (a) dissolving neutron-irradiated barium comprising barium and Cs-131, in a first solution comprising an acid, whereby the barium and Cs-131 are dissolved in the first solution; (b) adding the first solution to a second solution comprising carbonate, under conditions of rate of addition and mixing sufficient to precipitate the barium as a solid, whereby the Cs-131 remains dissolved in the combined solution of the first and second solutions; and (c) separating the solids from the combined solution containing the Cs-131, thereby purifying the Cs-131. In one embodiment, the separated solids of step (c) are subjected to the steps of: (i) storing the solids to allow additional Cs-131 to form from decay of barium; and (ii) repeating steps (a), (b) and (c) of the above method. In one embodiment, the method has additional step (d), comprising (d) contacting the combined solution containing the Cs-131 with a resin that removes barium, thereby removing trace barium if present from the Cs-131. In one embodiment, the method has additional step (d), comprising (d) evaporating the combined solution to incipient dryness to leave a residue containing the Cs-131. The embodiment may have additional steps (e) and (f), comprising (e) contacting the residue with at least 90-wt % $HNO_3$ whereby Cs-131 is dissolved in the acid solution and barium is precipitated as a solid; and (f) separating the solids from the acid solution containing the Cs-131, thereby removing trace barium if present from the Cs-131.

In one embodiment the method comprises the steps of dissolving irradiated Ba carbonate comprised of natural or enriched Ba including Ba-130, Ba-131, and Cs-131 from the decay of Ba-131 using acetic acid ($HC_2H_3O_2$). Using a reverse "strike" to produce a filterable precipitate, the dissolved Ba acetate is added to a solution of $(NH_4)_2CO_3$ to precipitate the Ba(II) as $BaCO_3$. The Cs-131 which is soluble in the carbonate-acetate solution is recovered by separating the Ba solids from the acetate solution and evaporating the solution to incipient dryness to remove the ammonium acetate and water from the Cs-131 product. The residue containing the Cs-131 and a trace of Ba is redissolved with a very small volume of dilute acetic acid, and ammonium carbonate $[(NH_4)_2CO_3]$ is added to the dilute acetic acid to precipitate additional $BaCO_3$. The filtrate containing Cs-131 is again recovered to separate it from the small trace of $BaCO_3$.

If desired, the filtrate containing 100% of the Cs-131 and a trace of Ba can be passed through a 3M Empore™ "web" disc of Sr Rad or Ra Rad to remove the last traces of Ba. The resulting solution can then be taken to dryness to remove any traces of nitrate and placed in a solution of choice. The initial $BaCO_3$ "cow" is "remilked" as additional Cs-131 becomes available from the decay of Ba-131. When no longer viable, the Ba carbonate is heated to remove excess water and returned for additional irradiation or storage.

These and other aspects of the present invention will become apparent upon reference to the following detailed description and attached drawings.

BRIEF DESCRIPTION OF THE SEVERAL VIEWS OF THE DRAWING(S)

FIG. 1, entitled "Reactor Generation of Ba-131 and Cs-131 In-Growth,"00 is a diagram of the in-growth of Ba-131 during 7-days in a typical reactor followed by decay after leaving the reactor.

FIG. 2, entitled "Simulated 'Milking' of Ba-131 Target," is a diagram of the buildup of Cs-131 with the decay of Ba-131.

FIG. 3, entitled "Cs/Ba Separations Process Flow Diagram," is a process flow diagram depicting the preferred embodiment of the process steps of the present invention.

DETAILED DESCRIPTION OF THE INVENTION

The present invention provides a method of separating and purifying Cs-131 from barium carbonate. The method is efficient and economical. In a particularly preferred embodiment, the trace of Ba (if present) is removed. Cs-131 preparations of purity heretofore unavailable are produced.

As shown by the disclosure herein, surprisingly the order in which the dissolved Ba "target" solution (e.g., Ba acetate) is combined with the saturated carbonate (e.g., ammonium carbonate) is important to precipitate the Ba but still allow the Cs to remain in solution. Unexpectedly it was discovered as disclosed herein that the solution containing the Cs should be slowly added with stirring to the carbonate solution ("reverse strike"), as opposed to adding the carbonate solution to the Cs containing solution ("direct strike"). The use of ammonium carbonate within the present invention in advantageous over other carbonates (e.g., sodium carbonate) because ammonium can be removed without the need for ion exchange to substitute for non-volatile cations (e.g., sodium).

It may be desirable to augment the method of the present invention to remove a trace of Ba if present in order to purify and convert the Cs-131 into an "ultra pure" final product. One of ordinary skill in the art of traditional ion exchange column methods will recognize that a number of organic resins have the potential to remove the trace of unwanted Ba from the Cs-131 product. IBC SuperLig® 620, Eichrom Sr Resin®, Eichrom Ln Resin® and Eichrom TRU Resin® are a few examples.

Alternatively, the 3M Empore™ Sr Rad or Radium Rad discs are uniquely suitable for removal of trace Ba and useful for a preferred embodiment of this invention. The discs are prepared and sold by 3M, St. Paul, Minn., and consist of a paper thin membrane containing cation exchange resin incorporated into a disc or cartridge, and can be designed to be placed on a syringe barrel. The 3M Empore™ extraction discs for the removal of trace Ba are an effective alternative to conventional radiochemical sample preparation methods that use wet chemistry or packed columns.

The exchange absorbing resin is ground to a very fine high-surface area powder and "is secured in a thin membrane as densely packed, element-selective particles held in a stable inert matrix of PTFE (polytrifluoroethylene) fibrils that separate, collect and concentrate the target radioisotope on the surface of the disc", in accordance with the method described in U.S. Pat. No. 5,071,610. The 3M Empore™ Sr Rad and Ra Rad discs are commercially sold for the quantitative determination of radio strontium (Sr) or radium (Ra) in aqueous solutions. As shown below, the Radium Rad and Strontium Rad discs work equally well for Ba.

In general, the solution containing the unwanted ion is passed through the paper thin extraction disc by placing the solution in a syringe barrel and forcing the solution through the disc with a plunger. The method takes from 10 seconds to 1 minute to complete. A second method is to place the extraction disc on a fritted or porous filter, and to force the solution through the disc by vacuum. The method is very fast and requires no ion exchange column system. The elimination of the need for column chromatography results in a reduction in downstream processing of solutions undergoing separation.

After the Cs-131 is separated from the Ba, the residual Ba carbonate "target" is stored to allow in-growth of additional Cs-131 in the crystal structure of the Ba carbonate solid, from the decay of Ba-131. To "milk" additional Cs-131 from the "target" or "cow," the Ba carbonate solid is dissolved in water to release the Cs-131.

As described above, Cs-131 is useful for example for radiotherapy (such as to treat malignancies). Where it is desired to implant a radioactive substance (e.g., Cs-131) into/near a tumor for therapy (brachytherapy), Cs-131 may be used as part of the fabrication of brachytherapy implant substance (e.g., seed). The use of Cs-131 in brachytherapy implant substances is not dependent on the method of fabrication of the substances. The method of the present invention provides purified Cs-131 for these and other uses.

DETAILED DESCRIPTION OF CERTAIN PREFERRED EMBODIMENTS

In accordance with preferred aspects of the invention, a preferred embodiment of the method of separation and purification of Cs-131 is initially described with reference to FIG. 3. It comprises the steps of 1 dissolving a quantity of neutron-irradiated $BaCO_3$ salt target in acetic acid ($HC_2H_3O_2$). This target is comprised of natural or enriched Ba, Ba-131 and Cs-131 formed by radioactive decay of Ba-131 (a typical irradiation of natural Ba yields $\sim 7 \times 10^{-7}$ gram Cs per gram Ba). The specific activity of Cs-131 is $\sim 1 \times 10^5$ Curies per gram of cesium. The acid reaction thereby releases the cesium

[Cs-131 C$_2$H$_3$O$_2$] from the Ba salt and produces a solution comprised of barium acetate [Ba(C$_2$H$_3$O$_2$)$_2$], cesium acetate (CsC$_2$H$_3$O$_2$), water (H$_2$O) and carbon dioxide gas (CO$_2$). Besides BaCO$_3$, any other target salt could be used that would be recognized by one of ordinary skill in the art in possession of the present disclosure, including barium oxide (BaO) and barium metal. However, the carbonate form is stable to neutron irradiation.

The use of acetic acid to dissolve the BaCO$_3$ was selected to obtain a solution that was compatible with subsequent steps. However, one of ordinary skill in the art in possession of the present disclosure will recognize that other organic or inorganic acids may be used. Ba(II) has a limited solubility in an excess of most mineral acids, e.g., HNO$_3$, HCl, H$_2$SO$_4$. The dissolution reaction is represented by the following equation:

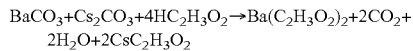

The dissolved Ba acetate "target" solution is precipitated 2 using saturated ammonium carbonate [(NH$_4$)$_2$CO$_3$] by slowly adding the solution containing the Cs to the carbonate solution ("reverse strike") with stirring to precipitate the Ba(II) as BaCO$_3$, allowing the Cs to remain in solution. The precipitation reaction is represented by the following equation:

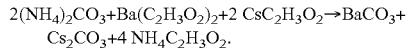

The precipitate is allowed to digest to form a filterable precipitate and is separated by filtration 3 or centrifugation. The precipitate is washed 4 with H$_2$O or (NH$_4$)$_2$CO$_3$ solution to remove additional interstitial Cs. The filtrate and wash solutions are evaporated to incipient dryness 5. The solids containing the Cs-131 and a trace of Ba are dissolved 6 in a very small volume of dilute acetic acid. The trace Ba in the solution is precipitated 7 with ammonium carbonate [(NH$_4$)$_2$CO3] to neutralize and to provide an excess of carbonate. After a period of ~30-minutes, the solution is filtered through a 0.45 μm filter to remove traces of precipitated BaCO$_3$ and taken to dryness 8. The final Cs-131 product is sampled for Ba and Cs analysis 9 to determine if it is necessary to repeat Steps 6, 7, 8 and 9 to further increase the Ba decontamination factor (Yes) or (No). The Cs-131 which has been purified and the solids are dissolved in H$_2$0 20 to the radionuclide purity acceptance criteria 10. An optional step to further remove trace Ba consists of adding 90-wt % HNO$_3$ 15 to the solids with stirring. Trace Ba(NO$_3$)$_2$ solids are removed by filtration 16 or centrifugation. The filtrate is analyzed to determine the trace Ba content. If no further removal is needed, the sample is evaporated 19 to dryness and dissolved in H$_2$O 20 to provide a purified Cs-131 product 10. If further trace removal is required, the solids 16 are dissolved in ~10M HNO$_3$ 17 and passed through a 3M Empore™ Sr Rad or Ra Rad membrane 18. The resulting solution is evaporated to incipient dryness 19 and dissolved in H$_2$O 20 to provide a purified Cs-131 product 10.

As additional Cs-131 becomes available from the decay of Ba-131, the initial BaCO$_3$ is "remilked" 11. When no further Cs-131 can be recovered economically, the BaCO$_3$ is heated 12 to 600-850° C. to remove H$_2$O and to prepare the "target" for recycle 13 back to the reactor, or 14 taken out of service.

The following Examples are offered by way of illustration and not by way of limitation.

EXAMPLES

Example 1

Removal of Trace Ba

3M Empore™ Test Conditions:
1. Make up 4 mL of 10M HNO$_3$ solution containing 80 each of 1000 μg Ba/mL, and 1000 μg Cs/mL. Take a Sr Rad disc (3M Co., St. Paul, Minn.). Precondition with 10M HNO$_3$. Pass 1 mL of Ba solution through the disc. Pass 1 mL of 10M HNO$_3$ through the disc as a rinse. Analyze 2 mL of the standard solution and 2 mL of the effluent for Ba and Cs.
2. Make up 5 mL of 10M HNO$_3$ solution containing 100 each of 1000 μg Ba/mL and 1000 μg Cs/mL. Take a Ra Rad disc (3M Co., St. Paul, Minn.). Precondition with 10M HNO$_3$. Pass 1 mL of Ba solution through the disc. Pass 1 mL of 10M HNO$_3$ through the disc as a rinse. Analyze 2 mL of the standard solution and 2 mL of the effluent for Ba and Cs.

TABLE 1

Analytical Laboratory Results

| 1. 10 M HNO$_3$ Standard | Sr Rad Disc | Fractional Recovery |
|---|---|---|
| Ba, 30 μg/mL | 0.38 μg/mL | 0.013 |
| Cs, 20 | 22 | 1 |

| 2. 10 M HNO$_3$ Standard | Ra Rad Disc | Fractional Recovery* |
|---|---|---|
| Ba, 30 μg/mL | 0.44 μg/mL | 0.015 |
| Cs, 20 | 24 | 1 |

*FR = Final/Initial, Fractional Recovery

The above results show that the Sr Rad Disc and the Ra Rad Disc are equally effective in recovery of Ba (Fractional Recovery=0.015).

Example 2

Cs/Ba Separation Process

Example Cs/Ba Separation Process:
The Cs-131 separation process was simulated using non-radioactive BaCO$_3$ and a standard solution of Cs. In addition, the process has been confirmed using ~51 grams of irradiated BaCO$_3$. Both radioactive and non-radioactive methods provide similar results. A typical non-radioactive test and results are given below:

a) 39.74 g of BaCO$_3$ "target" (27.66 g Ba) was dissolved in 100 mL of water using 0.52 moles of glacial acetic acid (17.4M).

b) A cesium standard solution containing 1000 μg Cs was added to the dissolved solution to follow the Cs(I) through the separation process.

c) A sample of the dissolved solution was taken for Ba and Cs analysis.

d) Approximately 194 mL of saturated 2.7M (NH$_4$)$_2$CO$_3$ was placed in a reaction flask.

e) The dissolved Ba acetate solution containing the Cs was slowly added ("reverse strike") to the ammonium carbonate solution with stirring to precipitate the Ba as BaCO$_3$, allowing the Cs to remain in solution. A "direct strike" (addition of the carbonate to the Ba acetate) produced a precipitate that was not easily filterable.

f) The precipitate was allowed to digest for 30 minutes to form a filterable precipitate and was separated by filtration.

g) Although $(NH_4)_2CO_3$ was selected to precipitate Ba(II), other carbonate salts as recognized by those of ordinary skill in the art may be used including $Na_2CO_3$, $K_2CO_3$, and $Li_2CO_3$. However, $(NH_4)_2CO_3$ was selected because of its ease of separation from the Cs(I) product by evaporation.

h) The precipitate was washed with two 50-mL volumes of $H_2O$, with filtration, to remove additional interstitial Cs. Although water was used, $(NH_4)_2CO_3$ or other carbonate salts may be useful to improve the separation by reducing the barium solubility in the wash solution.

i) The filtrate and wash solutions were combined (460 mL) and sampled for Ba and Cs analysis.

j) Starting with 27.66 g Ba ($2.8 \times 10^7$ ug Ba), 2714 ug Ba were found in the filtrate, for a Ba Decontamination Factor=~9,700, along with 97% of the Cs. This equates to approximately 0.01% of the Ba remaining with the filtrate and Cs.

k) To remove additional Ba from the Cs product, the filtrate and wash solution were evaporated to incipient dryness and dissolved in 10 mL of 0.1 M acetic acid. Approximately 1-mL of 2.7M $(NH_4)_2CO_3$ was added to the solution to neutralize and to provide an excess of carbonate. After a period of ~30-minutes, the solution was filtered through a 0.45 μm filter to remove additional traces of precipitated $BaCO_3$. The filtrate solution was sampled for Ba and Cs analysis.

l) Starting with ~2,700 ug Ba after the 1st separation, 103 ug Ba were found in the 2nd filtrate for an additional Ba DF=~26, along with ~100% of the Cs. The overall Ba DF was $2.6 \times 10^5$ or ~0.0004% of the initial Ba remained in the Cs final product.

m) Step (k and l) can be repeated using a small volume (1 to 5 mL) of solution to further decrease the Ba in the final Cs product.

n) If desired, the filtrate containing 100% of the Cs-131 and a trace of Ba may be passed through a 3M Empore™ "web" disc of Sr Rad or Ra Rad to remove the last traces of Ba.

o) The resulting solution can then be taken to dryness to remove any traces of nitrate and placed in a solution of choice.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention.

The invention claimed is:

1. A method for purifying Cs-131, comprising the steps of:
   (a) dissolving neutron-irradiated barium comprising barium and Cs-131, in a first solution comprising an acid, whereby the barium and Cs-131 are dissolved in the first solution;
   (b) adding the first solution to a second solution comprising carbonate, under conditions of rate of addition and mixing sufficient to precipitate the barium as a solid, whereby the Cs-131 remains dissolved in the combined solution of the first and second solutions; and
   (c) separating solids from the combined solution containing the Cs-131, thereby purifying the Cs-131.

2. The method according to claim 1 wherein the acid in step (a) is acetic acid.

3. The method according to claim 1 wherein the neutron-irradiated barium in step (a) is barium carbonate.

4. The method according to claim 1 wherein the carbonate in step (b) is ammonium carbonate.

5. The method according to claim 1 wherein the separated solids of step (c) are subjected to the steps of:
   (i) storing the solids to allow additional Cs-131 to form from decay of Ba-131; and
   (ii) repeating steps (a), (b) and (c) of claim 1.

6. The method according to any one of claims 1-5 having additional step (d), comprising (d) contacting the combined solution containing the Cs-131 of step (c) with a resin that removes barium, thereby removing trace barium if present from the Cs-131.

7. The method according to any one of claims 1-5 having additional steps (d) and (e), comprising (d) evaporating the combined solution containing the Cs-131 to incipient dryness; and (e) contacting the purified Cs-131 with a solution.

8. The method according to claim 6 having additional steps (e) and (f), comprising (e) evaporating the combined solution containing the purified Cs-131 of step (d) to incipient dryness; and (f) contacting the purified Cs-131 with a solution.

9. The method according to any one of claims 1-5 having additional step (d), comprising (d) evaporating the combined solution containing the Cs-131 to incipient dryness to leave a residue containing the Cs-131.

10. The method according to claim 9 whereby steps (a), (b), and (c) of claim 1 are repeated beginning with the residue of step (d).

11. The method according to claim 9 having additional steps (e) and (f), comprising (e) contacting the residue with at least 90-wt % $HNO_3$ whereby Cs-131 is dissolved in the acid solution and barium is precipitated as a solid; and (f) separating solids from the acid solution containing the Cs-131, thereby removing trace barium from the Cs-131.

\* \* \* \* \*